(12) United States Patent
Shin et al.

(10) Patent No.: US 12,510,554 B2
(45) Date of Patent: Dec. 30, 2025

(54) NUCLEIC ACID EXTRACTION MODULE AND NUCLEIC ACID TEST SYSTEM INCLUDING SAME

(71) Applicant: PUKYONG NATIONAL UNIVERSITY INDUSTRY-UNIVERSITY COOPERATION FOUNDATION, Busan (KR)

(72) Inventors: Joong Ho Shin, Busan (KR); Tran Huy Le Thang, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 120 days.

(21) Appl. No.: 17/997,646

(22) PCT Filed: Sep. 13, 2021

(86) PCT No.: PCT/KR2021/012430
§ 371 (c)(1),
(2) Date: Oct. 31, 2022

(87) PCT Pub. No.: WO2023/033224
PCT Pub. Date: Mar. 9, 2023

(65) Prior Publication Data
US 2024/0255536 A1    Aug. 1, 2024

(30) Foreign Application Priority Data

Sep. 1, 2021 (KR) .......................... 10-2021-0116088

(51) Int. Cl.
*G01N 35/10* (2006.01)
*G01N 35/00* (2006.01)

(52) U.S. Cl.
CPC ..... *G01N 35/1004* (2013.01); *G01N 35/1009* (2013.01)

(58) Field of Classification Search
None
See application file for complete search history.

(56) References Cited

U.S. PATENT DOCUMENTS

| 2012/0315191 A1 | 12/2012 | Maekawa et al. |
| 2015/0361419 A1 | 12/2015 | Kim et al. |

(Continued)

FOREIGN PATENT DOCUMENTS

| JP | 2017 515109 A | 6/2017 |
| JP | 2019 520566 A | 7/2019 |

(Continued)

OTHER PUBLICATIONS

Office Action received in corresponding Korean Patent Application No. 10-2021-0116088, dated Jun. 7, 2023.

*Primary Examiner* — P. Kathryn Wright
(74) *Attorney, Agent, or Firm* — Knobbe, Martens, Olson & Bear, LLP

(57) ABSTRACT

Provided are a nucleic acid extraction module and a nucleic acid test system including the same. A nucleic acid extraction module according to an embodiment of the present invention includes an extraction base in which a nucleic acid attachment member is disposed and a first flow path connected to one side of the nucleic acid attachment member and a second flow path connected to the other side of the nucleic acid attachment member are formed, an injection needle having a hollow shape, protruding from one side of the extraction base, and connected to the first flow path, and a discharge needle having a hollow shape, protruding from the other side of the extraction base, and connected to the second flow path.

15 Claims, 9 Drawing Sheets

(56) References Cited

U.S. PATENT DOCUMENTS

2017/0274376 A1* 9/2017 Nobile ................ B01L 3/50825
2017/0354362 A1* 12/2017 Xu ................... A61B 5/150251
2019/0201897 A1* 7/2019 Cereda ............. A61B 5/150351

FOREIGN PATENT DOCUMENTS

| JP | 6612259 B2 | 11/2019 |
| KR | 2011-0027419 A | 3/2011 |
| KR | 101630784 B1 | 6/2016 |
| KR | 2019-0047571 A | 5/2019 |

* cited by examiner

NUCLEIC ACID EXTRACTION MODULE AND NUCLEIC ACID TEST SYSTEM INCLUDING SAME

TECHNICAL FIELD

The present invention relates to a nucleic acid extraction module and a nucleic acid test system including the same, and more particularly, to a nucleic acid extraction module capable of extracting a nucleic acid from a sample without a separate component for moving the sample, and a nucleic acid test system including the same.

BACKGROUND ART

Nucleic acid (deoxyribonucleic acid (DNA) and ribonucleic acid (RNA)) amplification technologies are widely used for research and development and diagnosis in life science, genetic engineering, and medical fields. In particular, a nucleic acid amplification technology using polymerase chain reaction (PCR) among various nucleic acid amplification technologies is widely used. PCR may be used to amplify a specific nucleotide sequence in a genome as much as needed.

Such PCR is also used in a nucleic acid test system for amplifying an arbitrary nucleic acid and then determining whether the amplified nucleic acid is a target nucleic acid that is a detection target. In general, the nucleic acid test system amplifies the nucleic acid through PCR and determines whether the amplified nucleic acid is a specific nucleic acid through a fluorescence signal generated by radiating a light beam.

In this case, for PCR, a pretreatment process of extracting the nucleic acid from a sample including the nucleic acid is essential. This process goes through a complex process, such as several times of pipetting and centrifugation, from the pretreatment of the sample including the target nucleic acid to mixing with a PCR reagent. In this process, professional manpower capable of performing the process is required, expensive equipment and a space are required in the pretreatment process of extracting the nucleic acid from the sample, and thus it is difficult to easily apply a nucleic acid test in real time in the field.

DISCLOSURE

Technical Problem

The present invention is directed to providing a nucleic acid extraction module capable of automatically performing nucleic acid extraction and nucleic acid detection, and a nucleic acid test system including the same.

The present invention is directed to also providing a nucleic acid extraction module that can be used in real time in the field by reducing the size of a system for nucleic acid extraction and nucleic acid detection and simplifying operation of the system, and a nucleic acid test system including the same.

The aspects the present invention are not limited to the aspects described above, and those skilled in the art to which the present invention pertains will clearly understand other aspects not described from the following description.

Technical Solution

One aspect of the present invention provides a nucleic acid extraction module including an extraction base in which a nucleic acid attachment member is disposed and a first flow path connected to one side of the nucleic acid attachment member and a second flow path connected to the other side of the nucleic acid attachment member are formed, an injection needle having a hollow shape, protruding from one side of the extraction base, and connected to the first flow path, a discharge needle having a hollow shape, protruding from the other side of the extraction base, and connected to the second flow path, a sample container in which a sealed sample space is formed and a septum through which the injection needle passes to be in fluid communication with the first flow path is provided at one end thereof, and a waste sample container in which a sealed waste sample space having a pressure lower than a pressure of the sample space is formed and a septum through which the discharge needle passes to be in fluid communication with the second flow path is provided at one end thereof, wherein, when the injection needle and the discharge needle pass through the septum of the sample container and the septum of the waste sample container, a sample stored in the sample space moves to the nucleic acid attachment member through the first flow path by a pressure difference between the sample space and the waste sample space, and a nucleic acid included in the sample is adsorbed to the nucleic acid attachment member and then moves to the waste sample space through the second flow path.

The discharge needle may be formed parallel to the injection needle.

The nucleic acid attachment member may be formed in a plate shape, one end of the first flow path may be connected to the injection needle, the other end of the first flow path may be connected to an upper surface of the nucleic acid attachment member, one end of the second flow path may be connected to the discharge needle, and the other end of the second flow path may be connected to a lower surface of the nucleic acid attachment member.

A septum space in which a reactant is stored may be formed inside the septum of the sample container, and the reactant stored in the septum space may move to the sample space when the injection needle passes through the septum so that the first flow path and the sample space are in fluid communication with each other.

A protective film may be further provided by forming the septum space to open toward the sample space of the sample container and arranging the sample container at an open side of the septum space.

The septum space may have a plurality of spaces in a direction in which the injection needle passes.

The injection needle and the discharge needle may protrude upward in parallel, the sample container may be coupled to the injection needle as the sample container moves downward in a state in which the septum is disposed thereunder, and the waste sample container may be coupled to the discharge needle as the waste sample container moves downward at the same time as the sample container in a state in which the septum is disposed thereunder.

The nucleic acid extraction module may further include a washing liquid container in which a sealed washing liquid space is formed and a septum through which the injection needle passes to be in fluid communication with the first flow path is provided at one end thereof, and a waste washing liquid container in which a sealed waste washing liquid space having a pressure lower than a pressure of the washing liquid space is formed and a septum through which the discharge needle passes to be in fluid communication with the second flow path is provided at one end thereof, wherein, when the injection needle and the discharge needle pass through the septum of the washing liquid container and the septum of the waste washing liquid container, respectively, a washing liquid stored in the washing liquid space moves to the nucleic acid attachment member through the first flow path by a pressure difference between the washing liquid space and the waste washing liquid space, and moves to the waste washing liquid space through the second flow path after foreign substances of the nucleic acid attachment member are washed.

The washing liquid container and the waste washing liquid container may be provided as a plurality of washing liquid containers and a plurality of waste washing liquid containers.

The nucleic acid extraction module may further include a pump configured to provide a drying gas, a first drying container including a first drying space formed therein, a septum which is provided at one end thereof and through which the injection needle passes to be in fluid communication with the first flow path, and a first through-hole formed on one side thereof and coupled to the pump to inject the drying gas into the first drying space, and a second drying container having a second drying space formed therein, a septum which is provided at one end thereof and through which the discharge needle passes to be in fluid communication with the second flow path, and a second through-hole formed on one side thereof so that the second drying space is in fluid communication with the outside, wherein, when the injection needle and the discharge needle pass the septum of the first drying container and the septum of the second drying container, respectively, the drying gas passes through the first flow path, the nucleic acid attachment member, and the second flow path by the pump to remove the washing liquid.

The nucleic acid extraction module may further include an eluate container in which a sealed eluate space is formed and a septum through which the injection needle passes to be in fluid communication with the first flow path is provided at one end thereof, and a storage container in which a sealed storage space having a pressure lower than a pressure of the eluate space is formed and a septum through which the discharge needle passes to be in fluid communication with the second flow path is provided at one end thereof, wherein, when the injection needle and the discharge needle pass through the septum of the eluate container and the septum of the storage container, respectively, an eluate stored in the eluate space moves through the first flow path by a pressure difference between the eluate space and the storage space, dissolves the nucleic acid attached to the nucleic acid attachment member, and then moves to the storage space through the second flow path.

Another aspect of the present invention provides a nucleic acid test system including the nucleic acid extraction module; a test base in which a nucleic acid amplification chip is installed and which is disposed on one side of the extraction base, a test needle having a hollow shape, protruding from one side of the nucleic acid amplification chip, and connected to the nucleic acid amplification chip, a cartridge that is rotatable about a rotary shaft, is vertically movable in a direction in which the rotary shaft extends, and has a plurality of accommodation portions formed on a lower surface thereof and formed along a circumference around the rotary shaft, a rotary shaft member coupled to the rotary shaft of the cartridge, a first driving unit that reciprocates between an upper side of the extraction base and an upper side of the test base and is coupled to the rotary shaft member to transfer a driving force for the rotational movement and translational movement of the cartridge to the cartridge, and a nucleic acid test module including a light radiation unit configured to irradiate the nucleic acid amplification chip with light and a light detection unit configured to detect a fluorescent signal reflected from the nucleic acid amplification chip, wherein the sample container and the waste sample container, the washing liquid container and the waste washing liquid container, the first drying container and the second drying container, and the eluate container and the storage container are respectively accommodated in the plurality of accommodation portions such that the sample container and the waste sample container, the washing liquid container and the waste washing liquid container, the first drying container and the second drying container, and the eluate container and the storage container are arranged to face each other with the rotary shaft disposed at a center therebetween.

The nucleic acid test system may further include a first heater that heats the sample container.

The nucleic acid test system may further include a second heater disposed below the test base to control a temperature of the nucleic acid amplification chip.

The cartridge may repeatedly perform a vertical movement and a rotational movement about the rotary shaft while positioned above the extraction base, so that the sample container and the waste sample container, the washing liquid container and the waste washing liquid container, the first drying container and the second drying container, and the eluate container and the storage container are sequentially coupled to the injection needle and the discharge needle, respectively.

The cartridge may be lowered while positioned above the test base so that the storage container is coupled to the test needle, an inside of the nucleic acid amplification chip may be maintained at a pressure smaller than a pressure of the storage space of the storage container, and the eluate stored in the storage space may move into the nucleic acid amplification chip by a pressure difference between the inside of the nucleic acid amplification chip and the storage container when the test needle passes through the septum of the storage container.

The nucleic acid test system may further include a second driving unit disposed on one side of the first driving unit to provide a rotational driving force, and a drying arm that is connected to the pump, is coupled to the second driving unit, and pivots, wherein the drying arm pivots toward the first drying container in a state in which the first drying container and the second drying container are respectively coupled to the injection needle and the discharge needle, connects the through-hole of the first drying container and the pump, and supplies the drying gas to the first drying container.

Advantageous Effects

A nucleic acid extraction module and a nucleic acid test system having the same according to an embodiment of the present invention can easily extract a nucleic acid and detect a target nucleic acid regardless of a skill level of an operator by automatically performing nucleic acid extraction and nucleic acid detection.

Further, the nucleic acid extraction module and the nucleic acid test system having the same according to the embodiment of the present invention can be used in real time in the field by reducing the size of a system for nucleic acid extraction and nucleic acid detection and simplifying operation of the system.

The effects of the present invention are not limited to the above effects and should be understood to include all effects that may be deduced from the description of the present invention or the configuration of the present invention described in the appended claims.

MODES OF THE INVENTION

Figure 1:
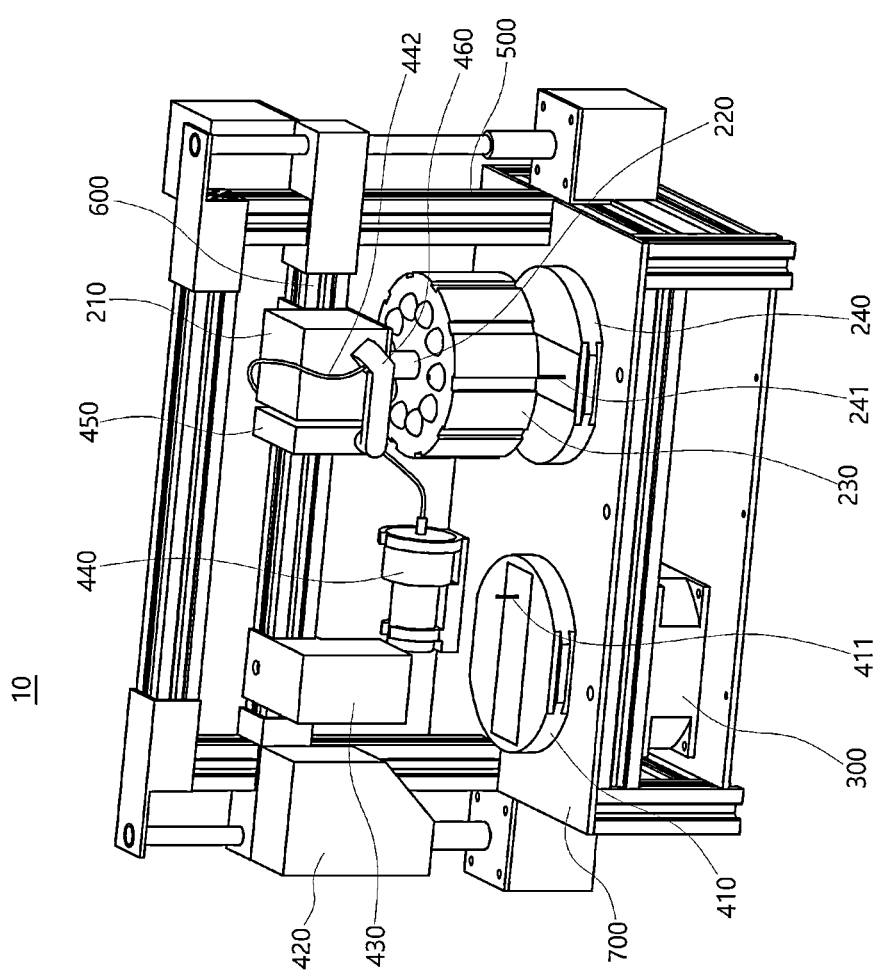
FIG. 1 is a perspective view of a nucleic acid test system according to an embodiment of the present invention.

Hereinafter, embodiments of the present invention will be described in detail with reference to the accompanying drawings so that those skilled in the art to which the present invention pertains may easily implement the present invention. The present invention may be implemented in various different forms and is not limited to the embodiments described herein.

In the drawings, parts irrelevant to the description are omitted in order to clearly describe the present invention, and the same reference numerals are assigned to the same or similar components throughout the specification.

Further, singular expressions include plural expressions unless clearly otherwise indicated in the context. Unless otherwise defined, terms used in the embodiments of the present invention may be interpreted as meanings commonly known to those skilled in the art.

Hereinafter, in FIG. 1, an X axis is defined as a rightward direction, a Y axis is defined as a forward direction, and a Z axis is defined as an upward direction. In this case, the rightward direction, the forward direction, and the upward direction are relative defined directions for convenience of description and may be different directions according to a direction in which a nucleic acid test system provided with a nucleic acid extraction module according to an embodiment of the present invention is placed or a position from which the nucleic acid test system is viewed.

The thickness or size of the component is exaggeratedly illustrated in the drawings in order to clearly express characteristics of the component, and the thickness or size of the component illustrated in the drawings is not necessarily illustrated to be the same as reality.

Although terms "first," "'second," etc. may be used to describe various components, the components should not be limited by the terms. The above terms may be only used to distinguish one component from another component. For example, without departing from the scope of the present invention, a "first component" may be referred to as a "second component," and similarly, a "second component" may be referred to as a "first component."

The present invention relates to a nucleic acid extraction module and a nucleic acid test system including the same, and more particularly, to a nucleic acid extraction module capable of extracting nucleic acid from a sample without a separate component for moving the sample, and a nucleic acid test system including the same.

In particular, the present invention provides a nucleic acid extraction module that can easily extract a nucleic acid regardless of a skill level of an operator by automatically performing nucleic acid extraction and nucleic acid detection and can be used in real time in the field by reducing the size of a system for the nucleic acid extraction and the nucleic acid detection and simplifying operation of the system by moving a sample using a pressure difference of a container, and a nucleic acid test system.

Figure 2:
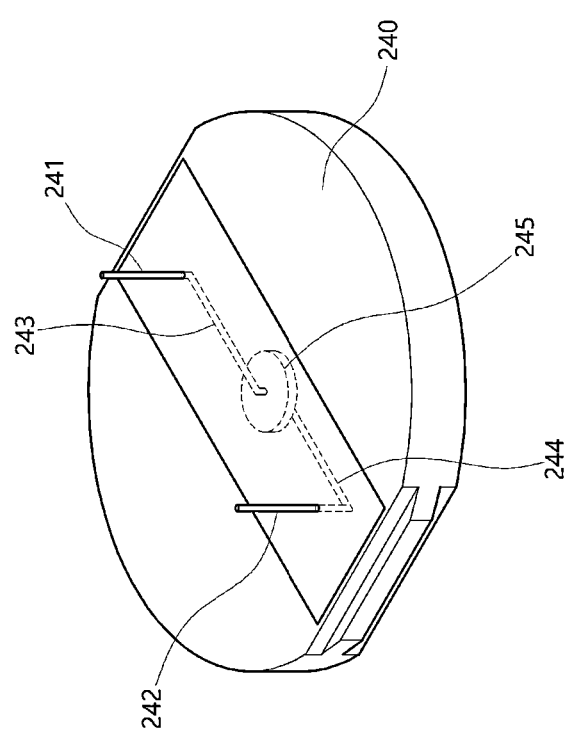
FIG. 2 is a perspective view of an extraction base of the nucleic acid test system according to the embodiment of the present invention.
Figure 3:
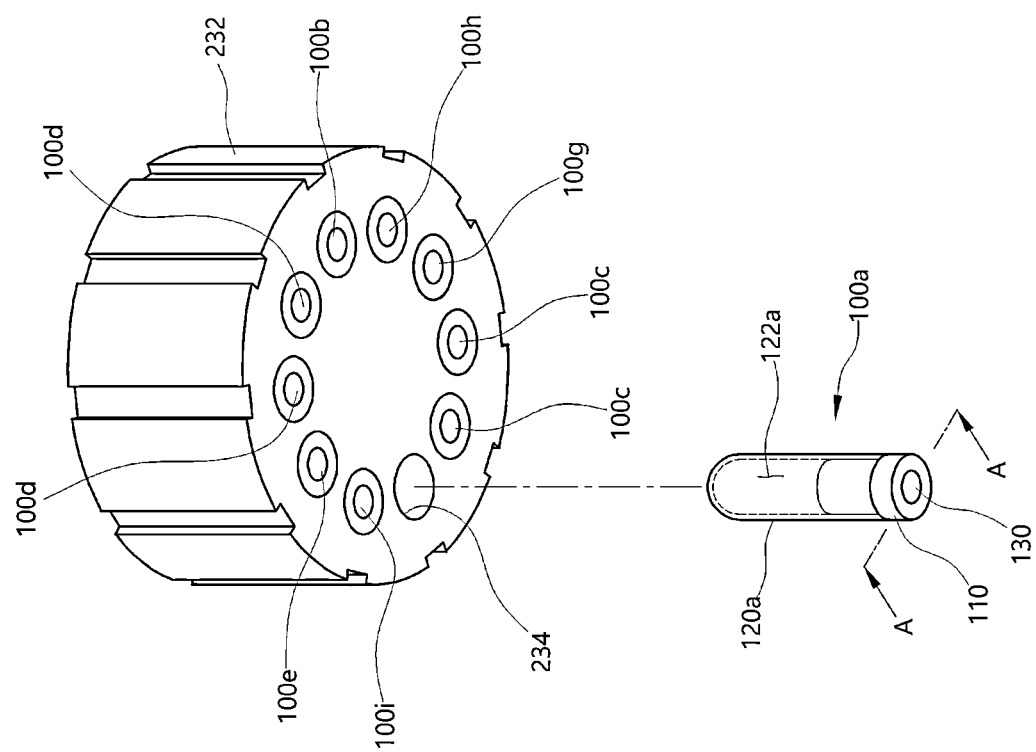
FIG. 3 is a perspective view of a cartridge and a sample container of the nucleic acid test system according to the embodiment of the present invention.
Figure 4:
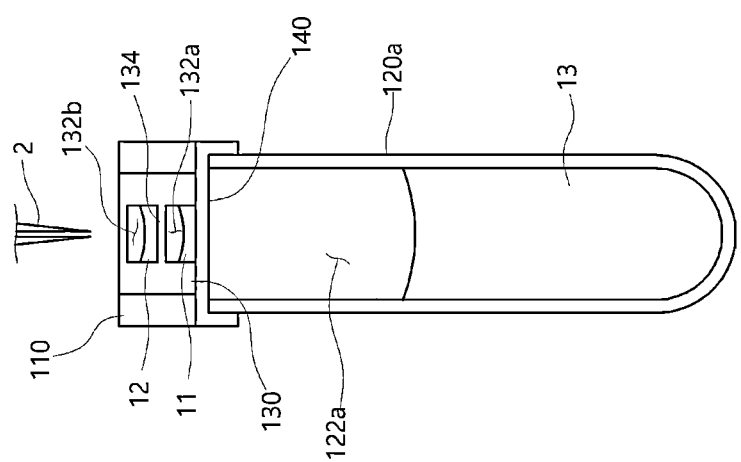
FIG. 4 is a cross-sectional view of the sample container of the nucleic acid test system according to the embodiment of the present invention.
Figure 5:
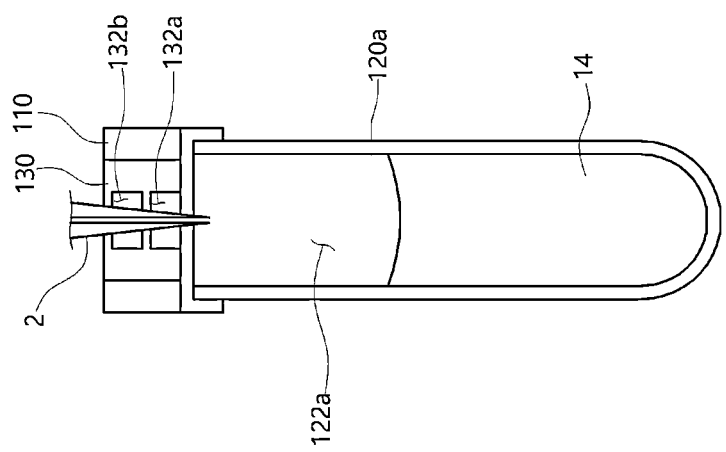
FIG. 5 is a cross-sectional view illustrating a state in which an insertion needle is coupled to the sample container of the nucleic acid test system according to the embodiment of the present invention.
Figure 6:
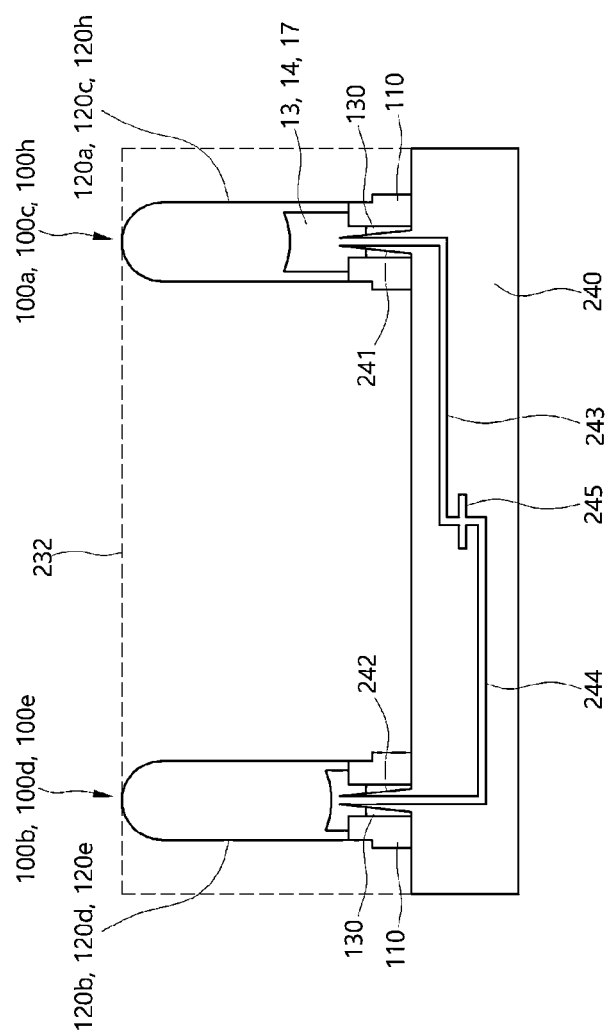
FIG. 6 is a cross-sectional view of the extraction base and the cartridge of the nucleic acid test system according to the embodiment of the present invention.
Figure 7:
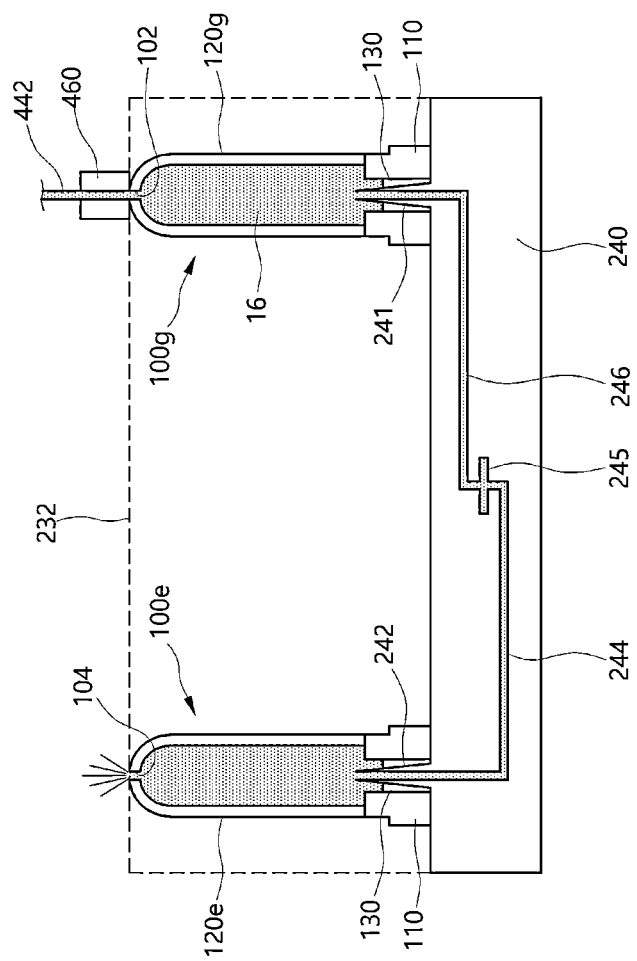
FIG. 7 is a cross-sectional view illustrating a state in which a pump and a first drying container of the nucleic acid test system according to the embodiment of the present invention are coupled to each other.

FIG. 1 is a perspective view of a nucleic acid test system according to an embodiment of the present invention. FIG. 2 is a perspective view of an extraction base of the nucleic acid test system according to the embodiment of the present invention. FIG. 3 is a perspective view of a cartridge and a sample container of the nucleic acid test system according to the embodiment of the present invention. FIG. 4 is a cross-sectional view of the sample container of the nucleic acid test system according to the embodiment of the present invention. FIG. 5 is a cross-sectional view illustrating a state in which an insertion needle is coupled to the sample container of the nucleic acid test system according to the embodiment of the present invention. FIG. 6 is a cross-sectional view of the extraction base and the cartridge of the nucleic acid test system according to the embodiment of the present invention. FIG. 7 is a cross-sectional view illustrating a state in which a pump and a first drying container of the nucleic acid test system according to the embodiment of the present invention are coupled to each other.

Referring to FIG. 1, a nucleic acid extraction module 1 according to the embodiment of the present invention includes an extraction base 240, an injection needle 241, a discharge needle 242, a sample container 100a, and a waste sample container 100a.

As illustrated in FIGS. 1 and 2, an upper surface of the extraction base 240 is formed in a flat plate shape. The injection needle 241 and the discharge needle 242 are arranged on an upper surface of the extraction base 240 to face each other at both end portions of the upper surface.

In this case, the injection needle 241 and the discharge needle 242 may be spaced a predetermined distance from each other and protrude in parallel to each other.

The injection needle 241 and the discharge needle 242 are formed with flow paths through which a fluid may move in a protruding longitudinal direction. That is, the injection needle 241 and the discharge needle 242 may be formed in a hollow shape. The injection needle 241 and the discharge needle 242 may be sharply formed so that a septum, which will be described below, easily passes through upper ends thereof.

The injection needle 241 and the discharge needle 242 are connected by a flow path formed inside the extraction base 240. In more detail, as illustrated in FIG. 2, an end of the injection needle 241 at the extraction base 240 is connected to a first flow path 243 formed inside the extraction base 240. Further, an end of the discharge needle 242 at the extraction base 240 is connected to a second flow path 244 formed inside the extraction base 240.

The first flow path 243 and the second flow path 244 are connected to each other, and accordingly, a fluid introduced into the injection needle 241 passes through the inside of the extraction base 240 and is discharged through the discharge needle 242.

In this case, as illustrated in FIG. 2, a nucleic acid attachment member 245 is disposed between the first flow path 243 and the second flow path 244. The nucleic acid attachment member 245 serves to separate nucleic acids from foreign substances other than the nucleic acids in a sample introduced through the first flow path 243. Accordingly, the nucleic acid is attached to the nucleic acid attachment member 245 and the remaining foreign substances are discharged through the second flow path 244. The embodiment of the nucleic acid attachment member 245 is not limited as long as the nucleic acid attachment member 245 is able to separate nucleic acids from other materials. The nucleic acid attachment member 245 may be, for example, a silica membrane.

As illustrated in FIG. 2, the nucleic acid attachment member 245 may be formed in a disk shape and disposed inside the extraction base 240. In this case, the plate-shaped nucleic acid attachment member 245 may be disposed parallel to the upper surface of the extraction base 240 to increase an area in which the sample introduced through the first flow path 243 comes into contact with the nucleic acid attachment member 245.

Further, an end of the first flow path 243 at the nucleic acid attachment member 245 may be connected to a center of an upper surface of the nucleic acid attachment member 245, and an end of the second flow path 244 at the nucleic acid attachment member 245 may be connected to a center of a lower surface of the nucleic acid attachment member 245 so that the sample may smoothly pass through the extraction base 240. Therefore, the sample may more smoothly pass through the nucleic acid attachment member 245 by gravity while moving in a direction of its own weight.

In this case, the sample container 100a is coupled to the injection needle 241 so that the sample is provided to the nucleic acid attachment member 245. As illustrated in FIG. 3, the sample container 100a is formed to extend in length such that a sample space 122a is formed therein.

The sample space 122a is sealed from the outside of the sample container 100a. In this case, a septum 130 is disposed on an end of the sample container 100a such that the sample space 122a may be connected to the first flow path 243 as the sample container 100a is coupled to the injection needle 241.

The septum 130 is made of a material by which the septum 130 may be coupled to the injection needle 241 as the sharp injection needle 241 passes through the septum 130 and by which the sample space 122a may be sealed from the outside again when separated from the injection needle 241. The septum 130 may be made of, for example, rubber, silicone, or the like, but the present invention is not limited thereto.

As illustrated in FIG. 4, the septum 130 may be disposed in a central portion of a cap 110 coupled to one end of the sample container 100a having one open end. In this case, the septum 130 is formed such that a direction in which the injection needle 241 is inserted coincides with an extension direction of the sample container 100a.

Meanwhile, as illustrated in FIG. 4, a septum space 132 may be formed in the septum 130 of the nucleic acid extraction module 1 according to the embodiment of the present invention.

The septum space 132 may be formed inside the septum 130, and the septum space 132 may contain a reactant capable of reacting with a sample 13, for example, a degradation enzyme mixed into the sample to extract a nucleic acid. The reactant may be a liquid or solid as long as the reactant can be stored in the septum space 132.

By forming the septum space 132, as illustrated in FIG. 5, when blood, which is the sample 13, is injected into the sample space 122a through the septum 130 using an insertion needle 2, for example, a syringe needle, the reactant provided in the septum space 132 may be inserted into the sample space 122a while the insertion needle 2 passes through the septum 130. Therefore, a nucleic acid can be extracted by easily mixing the reactant with the sample 13 in the field using the septum 130 prepared in advance without a separate mixing operation.

In particular, as illustrated in FIGS. 4 and 5, the septum space 132 may be partitioned into a plurality of spaces. For example, the septum space 132 may be partitioned into two spaces, that is, a first septum space 132a and a second septum space 132b as illustrated in FIG. 4. However, the number of spaces is not limited.

In this case, the first septum space 132a and the second septum space 132b are arranged in a direction in which the injection needle 241 is inserted. The reactant, which is to be separately stored before being mixed with the sample 13, may be disposed in each space. In the present embodiment, a reactant stored in the first septum space 132a is defined as a first reactant 11, and a reactant stored in the second septum space 132b is defined as a second reactant 12.

With this arrangement, when the blood, which is the sample 13, is injected into the sample space 122a through the septum 130 using the syringe needle, both the first reactant 11 provided in the first septum space 132a and the second reactant 12 provided in the second septum space 132b may be inserted into the sample space 122a while the insertion needle 2 passes through the septum 130.

Meanwhile, as illustrated in FIGS. 4 and 5, the sample container 100a of the nucleic acid extraction module 1 according to the embodiment of the present invention may further include a protective film 140.

The protective film 140 is disposed between the septum 130 and one end of the open sample container 100a so that the septum space 132 and the sample space 122a are partitioned when the septum space 132 is recessed at one side of the septum 130.

By providing the protective film 140, the septum space 132 can be easily manufactured as compared to a case in which the septum space 132 is formed therein. Also, when the protective film 140 is broken while the injection needle 241 passes through the septum 130, the reactant in the septum space 132 may be reliably moved to the sample space 122a.

Meanwhile, as illustrated in FIG. 6, the waste sample container 100a is coupled to the discharge needle 242 to correspond to the coupling of the sample container 100a to the injection needle 241. In this case, since the shape of the waste sample container 100a and the configuration of the septum 130 for coupling the waste sample container 100a to the discharge needle 242 are the same as those of the sample container 100a, a description thereof will be omitted.

A waste sample space 122b corresponding to the sample space 122a of the sample container 100a is formed inside the waste sample container 100a. In this case, the waste sample space 122b is formed to have a pressure that is lower than an internal pressure of the sample space 122a. For example, in an initial state, the sample space 122a may have a positive pressure and the waste sample space 122b may have a negative pressure. However, a pressure value at which the pressure inside the waste sample space 122b is lower than the pressure inside the sample space 122a is not limited.

The waste sample space 122b is connected to the second flow path 244 to be in fluid communication as the waste sample space 122b is coupled to the discharge needle 242. In this case, the waste sample container 100a is simultaneously coupled to the sample container 100a, the discharge needle 242, and the injection needle 241. To this end, the sample container 100a and the waste sample container 100a are coupled to a cartridge 230, which will be described below, and the sample container 100a and the waste sample container 100a are fixedly inserted onto the injection needle 241 and the discharge needle 242, the sample space 122a and the waste sample space 122b are connected to each other by the first flow path 243 and the second flow path 244 to be in fluid communication. In this case, since a pressure difference is present between the sample space 122a and the waste sample space 122b, the sample stored in the sample space 122a moves along the first flow path 243 due to the pressure difference.

As illustrated in FIG. 6, a nucleic acid is separated from the moved sample while the moved sample passes through the nucleic acid attachment member 245, the separated nucleic acid remains after being attached to the nucleic acid attachment member 245, and other foreign substances are moved to the waste sample space 122b through the second flow path 244.

In this case, as illustrated in FIG. 6, in a state in which the injection needle 241 and the discharge needle 242 are arranged to face upward and the septum 130 is arranged to face downward, the sample container 100a and the waste sample container 100a are coupled to the injection needle 241 and the discharge needle 242.

Accordingly, the sample is disposed on a lower side of the sample space 122a, that is, a side facing the septum 130, into which the injection needle 241 is inserted, air is disposed thereabove, and thus the sample may first move along the first flow path 243, thereby the efficiency of extracting a nucleic acid can be increased.

Referring to FIG. 6, the nucleic acid extraction module 1 according to the embodiment of the present invention may further include a washing liquid container 100c and a waste washing liquid container 100d. In this case, since the shape of the washing liquid container 100c and the waste washing liquid container 100d and the configuration of the septum 130 for coupling the injection needle 241 and the discharge needle 242 are the same as those of the sample container 100a, a description thereof will be omitted.

A washing liquid space 122c in which a washing liquid may be stored is formed inside the washing liquid space 122c, and a waste washing liquid space 122d is formed inside the waste washing liquid container 100d. In this case, a washing liquid serves to move foreign substances except for the nucleic acid attached to the nucleic acid attachment member 245 into the waste washing liquid space 122d. A washing liquid 14 may be, for example, ethanol, but the present invention is not limited thereto.

The washing liquid container 100c and the waste washing liquid container 100c are respectively coupled to the injection needle 241 and the discharge needle 242 like the sample container 100a and the waste sample container 100a. The washing liquid 14 in the washing liquid space 122c moves along the first flow path 243 using a pressure difference between the washing liquid space 122c and the waste washing liquid space 122d, washes the nucleic acid attachment member 245, and then moves to the waste washing liquid space 122d along the second flow path 244.

In the nucleic acid extraction module 1 according to the embodiment of the present invention, the washing liquid container 100c may be provided as a plurality of washing liquid containers 100c, and the waste washing liquid container 100d may be provided as a plurality of waste washing liquid containers 100d. Accordingly, the washing process is repeated a plurality of times, and thus, foreign substances can be prevented from remaining on the nucleic acid attachment member 245 to lower nucleic acid detection efficiency.

Referring to FIGS. 1 and 7, the nucleic acid extraction module 1 according to the embodiment of the present invention may further include a pump 440, a first drying container 100g, and a second drying container 100j. In this case, since the shape of the first drying container 100g and the second drying container 100j and the configuration of the septum 130 for coupling the injection needle 241 and the discharge needle 242 are the same as those of the sample container 100a, a description thereof will be omitted.

The pump 440 provides a drying gas. The type of the pump 440 is not limited as long as the pump 440 can provide a drying gas.

A drying gas 16 provided by the pump 440 moves to the first drying container 100g. As illustrated in FIG. 7, a first drying space 122g is formed inside the first drying container 100g, and a first through-hole 102 that may be connected to the pump 440 is formed in an end of the first drying container 100g, which is opposite to a side on which the septum 130 is disposed. The pump 440 is connected to the first through-hole 102 by a drying arm 460 and a hose 442, which will be described below, and a detailed description thereof will be made below.

As illustrated in FIG. 7, when the pump 440 is operated in a state in which the first drying container 100g and the second drying container 100j are respectively coupled to the injection needle 241 and the discharge needle 242, the drying gas 16 passes through the first flow path, the nucleic acid attachment member 245, and the second flow path 244 by the pump 440 to remove the washing liquid.

The drying gas 16 is discharged to the outside through a second drying space 122e formed inside the second drying container 100j. Accordingly, the nucleic acid attachment member 245 is dried, and the nucleic acid to be amplified remains on the nucleic acid attachment member 245.

Referring to FIG. 6, the nucleic acid extraction module 1 according to the embodiment of the present invention may further include an eluate container 100h and a storage container 100i. In this case, since the shape of the eluate container 100h and the storage container 100i and the configuration of the septum 130 for coupling the injection needle 241 and the discharge needle 242 are the same as those of the sample container 100a, a description thereof will be omitted.

An eluate space 122h in which an eluate may be stored is formed inside the eluate container 100h. The eluate stored in the eluate space 122h is coupled to the injection needle 241 and the discharge needle 242 like the sample container 100a and the waste sample container 100a. An eluate 17 in the eluate space 122h moves along the first flow path using a pressure difference between the eluate space 122h and the storage space 122i, dissolves a nucleic acid attached to the nucleic acid attachment member 245, and then moves to the storage space 122i along the second flow path 244 together with the nucleic acid.

Figure 8:
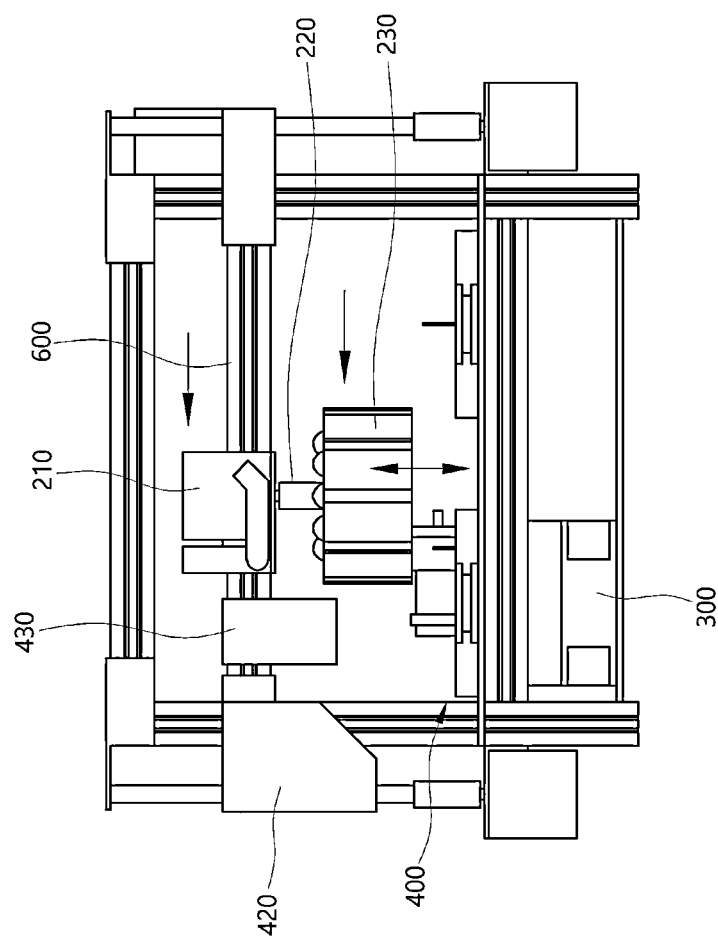
FIG. 8 is a cross-sectional view illustrating a state in which a first driving part of the nucleic acid test system according to the embodiment of the present invention moves to a nucleic acid test module.
Figure 9:
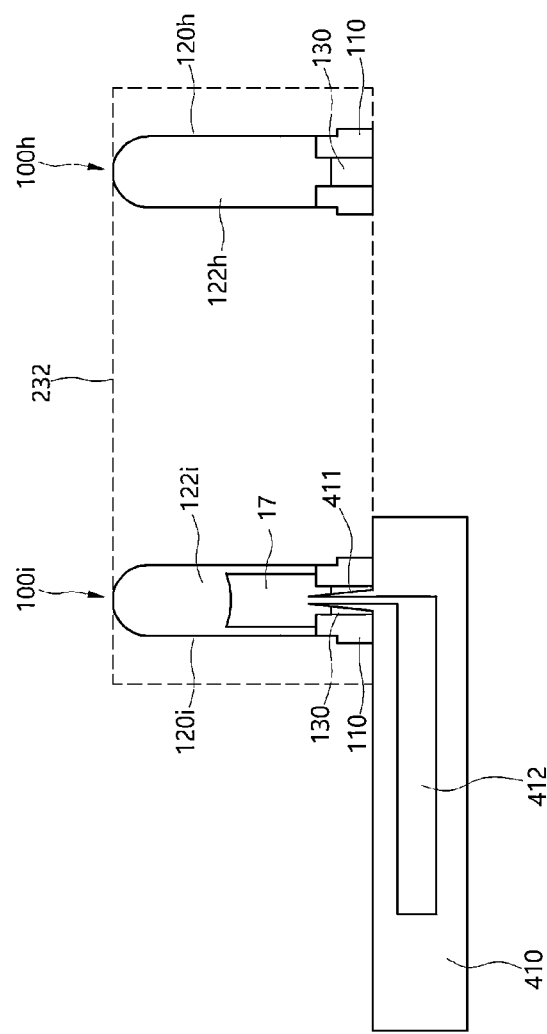
FIG. 9 is a cross-sectional view illustrating a state in which a storage container and a test needle of the nucleic acid test system according to the embodiment of the present invention are coupled to each other.

FIG. 8 is a cross-sectional view illustrating a state in which a first driving part of the nucleic acid test system according to the embodiment of the present invention moves to a nucleic acid test module. FIG. 9 is a cross-sectional view illustrating a state in which a storage container and a test needle of the nucleic acid test system according to the embodiment of the present invention are coupled to each other.

The nucleic acid moved to the storage space 122i is amplified and identified by a nucleic acid test system, which will be described below. Referring to FIGS. 1 and 8, a nucleic acid test system 10 having the nucleic acid extraction module 1 according to the embodiment of the present invention includes a test base 410, a test needle 411, a cartridge 230, a rotary shaft member 220, a first driving unit 210, and a nucleic acid test module 400.

As illustrated in FIG. 8, an upper surface of the test base 410 is formed in a flat plate shape. The test base 410 is disposed on one side of the extraction base 240.

A nucleic acid amplification chip 412 amplifies a nucleic acid through polymerase chain reaction (PCR) when the nucleic acid is introduced. In this case, a widely known component may be used as the nucleic acid amplification chip 412, and a detailed description thereof will be omitted.

The test needle 411 is formed on the upper surface of the test base 410 at the extraction base 240. The test needle 411 may protrude parallel to the injection needle 241 and the discharge needle 242. As the test needle 411, the injection needle 241, and the discharge needle 242 are arranged in parallel, the above-described containers may be automatically coupled to the test needle 411, the injection needle 241, and the discharge needle 242 using the cartridge 230 which will be described below. This will be described together with the cartridge 230.

The insertion needle 2 has a flow path formed therein in a protruding longitudinal direction, the fluid being able to move through the flow path. That is, the insertion needle 2 may be formed in a hollow shape. Like the injection needle 241 and the discharge needle 242, an upper end of the insertion needle 2 may be sharply formed to easily pass through the septum 130.

The insertion needle 2 is connected to the nucleic acid amplification chip 412 installed in the test base 410. In this case, an internal pressure of the nucleic acid amplification chip 412 is formed to be smaller than a pressure of the storage space 122i of the storage container 100i. For example, the internal pressure of the nucleic acid amplification chip 412 may have a negative pressure and the storage space 122i may have a positive pressure. However, a pressure value at which the pressure inside the nucleic acid amplification chip 412 is lower than the pressure inside the storage space 122i is not limited.

Accordingly, when the test needle 411 passes through the septum of the storage container 100i, the eluate 17 stored in the storage space 122i is moved into the nucleic acid amplification chip 412 due to a pressure difference between the inside of the nucleic acid amplification chip 412 and the storage space 122i.

A nucleic acid moved into the nucleic acid amplification chip 412 is amplified so that the nucleic acid can be detected through PCR. In this case, in PCR, it is necessary to control a temperature for the purpose of a reaction of an enzyme.

To this end, as illustrated in FIGS. 1 and 8, the nucleic acid test system 10 having the nucleic acid extraction module 1 according to the embodiment of the present invention may further include a second heater 300.

The second heater 300 is disposed below the test base 410 to control the temperature of the nucleic acid amplification chip 412. A widely known device may be used as the second heater 300 as long as the device can control the temperature of the nucleic acid amplification chip 412, and an operation method therefor is not limited.

The nucleic acid test module 400 includes a light radiation unit 420 and a light detection unit 430 to determine the type of nucleic acid that is moved from the storage container 100i to the nucleic acid amplification chip 412 and amplified. When the nucleic acid amplification chip is irradiated with light through the light radiation unit 420, the light detection unit 430 detects a specific fluorescence signal reflected from the nucleic acid amplification chip 412 when a target nucleic acid is present.

Accordingly, the type of nucleic acid being detected can be determined using the fluorescence signal collected through the light detection unit 430.

Meanwhile, as illustrated in FIG. 3, the nucleic acid test system 10 having the nucleic acid extraction module 1 according to the embodiment of the present invention includes the cartridge 230. The cartridge 230 accommodates the respective containers and transports the accommodated containers so that the above-described nucleic acid extraction and nucleic acid detection can be automatically performed.

In more detail, as illustrated in FIG. 3, the cartridge 230 is formed in a tubular shape, for example, a cylindrical shape that is easy to rotate. The rotary shaft member 220 that supports rotation of the cartridge 230 and provides a rotational force to the cartridge 230 is coupled to a center of the cartridge 230. Accordingly, the cartridge 230 rotates about a longitudinal extension direction of the rotary shaft member 220.

On a lower surface of the cartridge 230, a plurality of accommodation portions 234 are formed along a circumference of the cartridge 230 around the rotary shaft. In this case, the sample container 100a and the waste sample container 100a, the washing liquid container 100c and the waste washing liquid container 100d, the first drying container 100g and the second drying container 100e, and the eluate container 100h and the storage container 100i may each be accommodated in a corresponding accommodation portion.

In this case, the sample container 100a and the waste sample container 100a, the washing liquid container 100c and the waste washing liquid container 100d, the first drying container 100g and the second drying container 100e, and the eluate container 100h and the storage container 100i are arranged in the accommodation portions 234 to face each other with the rotary shaft disposed at a center therebetween. Therefore, the sample container 100a and the waste sample container 100a, the washing liquid container 100c and the waste washing liquid container 100d, the first drying container 100g and the second drying container 100e, and the eluate container 100h and the storage container 100i may be sequentially coupled to the injection needle 241 and the discharge needle 242 while coupled to the cartridge 230.

The shape of the accommodation portions 234 is not limited, and the accommodation portions 234 may have a recessed groove shape or a through-hole shape. In a state in which the respective containers are accommodated in the accommodation portions 234, the containers may be fixed so as not to be separated therefrom.

The cartridge 230 may be provided in a state in which the containers are accommodated in the accommodation portions 234, and the operator can extract and detect a nucleic acid by coupling only the cartridge 230 to the rotary shaft member 220.

As illustrated in FIGS. 1 and 8, the first driving unit 210 is coupled to the rotary shaft member 220 of the cartridge 230. The first driving unit 210 provides a driving force for the rotational movement and translational movement of the cartridge 230 through the rotary shaft member 220. Further, the first driving unit 210 itself may reciprocate along a rail 600 in a state in which an upper side of the extraction base 240 and an upper side of the test base 410 are supported by a frame 500 disposed perpendicular to the ground. However, the shapes of the frame 500 and the rail 600 are not limited as long as the first driving unit 210 can reciprocate between the extraction base 240 and the test base 410.

In detailed description of the movement of the first driving unit 210 and the movement of the cartridge 230 thereby, the first driving unit 210 controls the vertical movement and rotational movement of the cartridge 230 while remaining above the extraction base 240. In this case, the first driving unit 210 controls the cartridge 230 so that the sample container 100a and the waste sample container 100a, the washing liquid container 100c and the waste washing liquid container 100d, the first drying container 100g and the second drying container 100j, and the eluate container 100h and the storage container 100i accommodated in the cartridge 230 may each be sequentially coupled to the injection needle 241 and the discharge needle 242.

In detailed description of the above process through a process from the sample container 100a and the waste sample container 100a to the washing liquid container 100c and the waste washing liquid container 100d, when the sample in the sample space 122a moves to the waste sample space 122b as the sample container 100a and the waste sample container 100a are coupled to the injection needle 241 and the discharge needle 242 by lowering the cartridge 230, the cartridge 230 is raised again, the cartridge 230 rotates by a predetermined angle so that the washing liquid container 100c and the waste washing liquid container 100d may be arranged above the injection needle 241 and the discharge needle 242, the cartridge 230 is lowered again, and thus the washing liquid container 100c and the waste washing liquid container 100d may be coupled to the injection needle 241 and the discharge needle 242.

Until the eluate in which the nucleic acid is dissolved is stored in the storage container 100i, the above process is performed in the order of the sample container 100a and the waste sample container 100a, the washing liquid container 100c and the waste washing liquid container 100d, the first drying container 100g and the second drying container 100j, and the eluate container 100h and the storage container 100i.

When the eluate in which the nucleic acid is dissolved is stored in the storage container 100i, the first driving unit 210 moves to the upper side of the test base 410 along the rail 600. In this case, as illustrated in FIG. 8, the first driving unit 210 moves so that the first driving unit 210 overlaps an end of the test base 410 at the extraction base 240, that is, the storage container 100i is disposed above the test needle 411 of the test base 410.

In this state, the first driving unit 210 lowers the cartridge 230 so that the storage container 100i and the test needle 411 may be coupled and the eluate in the storage container 100i moves to the nucleic acid amplification chip 412. The nucleic acid moved to the nucleic acid amplification chip 412 together with the eluate is amplified inside the nucleic acid amplification chip 412, and whether the nucleic acid corresponds to the target nucleic acid is identified by the nucleic acid test module 400.

Meanwhile, referring to FIGS. 1, 7, and 8, the nucleic acid extraction system having the nucleic acid extraction module 1 according to the embodiment of the present invention may further include a second driving unit 450 and a drying arm 460.

The second driving unit 450 is disposed on one side of the first driving unit 210 and provides a rotational driving force. In this case, the second driving unit 450 may be integrally formed with the first driving unit 210, but the present invention is not limited thereto.

The pivotable drying arm 460 is coupled to the second driving unit 450. When the first drying container 100g is coupled to the injection needle 241, the drying arm 460 pivots to be coupled to the through-hole 102 formed at the upper end of the injection needle 241.

In this case, the drying arm 460 is connected to the pump 440 and may inject the drying gas 16 into the first drying container 100g through the through-hole 102. The pump 440 and the drying arm 460 may be connected by the hose 442, but the present invention is not limited thereto as long as the drying gas 16 of the pump 440 may be provided through the drying arm 460. In this case, as described above, the injected drying gas 16 is discharged to the outside through the through-hole 102 of the second drying container 100j.

Meanwhile, the nucleic acid test system 10 having the nucleic acid extraction module 1 according to the embodiment of the present invention may further include a first heater 300.

The first heater 300 serves to, after the sample 13 is injected into the sample space 122a of the sample container 100a for the nucleic acid extraction, heat the reactant stored in the septum space 132 and the sample 13 to react with each other. The first heater 300 may be formed on one side of the nucleic acid test system 10 to heat the sample container 100a in an accommodated state, but embodiments are not limited as long as it is possible to control the sample container 100a to be heated to a specific temperature.

As described above, exemplary embodiments of the present invention have been described, it is obvious to those skilled in the art that the present invention can be embodied in other specific forms in addition to the above-described embodiments without departing from the spirit or scope of the present invention. Therefore, the above-described embodiments should be considered as being illustrative rather than restrictive, and accordingly, the present invention is not limited by the above description but may be modified within the scope of the appended claims and the equivalents thereto.

The invention claimed is:
1. A nucleic acid extraction module comprising:
an extraction base in which a nucleic acid attachment member is disposed and a first flow path connected to one side of the nucleic acid attachment member and a second flow path connected to the other side of the nucleic acid attachment member are formed;
an injection needle having a hollow shape, protruding from one side of the extraction base, and connected to the first flow path;
a discharge needle having a hollow shape, protruding from the other side of the extraction base, and connected to the second flow path;

a sample container in which a sealed sample space is formed and a septum through which the injection needle passes to be in fluid communication with the first flow path is provided at one end thereof, and a waste sample container in which a sealed waste sample space having a pressure lower than a pressure of the sample space is formed and a septum through which the discharge needle passes to be in fluid communication with the second flow path is provided at one end thereof, wherein, when the injection needle and the discharge needle pass through the septum of the sample container and the septum of the waste sample container, a sample stored in the sample space moves to the nucleic acid attachment member through the first flow path by a pressure difference between the sample space and the waste sample space, and a nucleic acid included in the sample is adsorbed to the nucleic acid attachment member and then moves to the waste sample space through the second flow path, wherein the nucleic acid attachment member is formed in a plate shape, one end of the first flow path is connected to the injection needle, and the other end of the first flow path is connected to an upper surface of the nucleic acid attachment member, and one end of the second flow path is connected to the discharge needle, and the other end of the second flow path is connected to a lower surface of the nucleic acid attachment member, wherein a septum space in which a reactant is stored is formed inside the septum of the sample container, and the reactant stored in the septum space moves to the sample space when the injection needle passes through the septum so that the first flow path and the sample space are in fluid communication with each other.

2. The nucleic acid extraction module of claim 1, wherein the discharge needle is formed parallel to the injection needle.

3. The nucleic acid extraction module of claim 1, wherein a protective film is further provided by forming the septum space to open toward the sample space of the sample container and arranging the sample container at an open side of the septum space.

4. The nucleic acid extraction module of claim 1, wherein the septum space has a plurality of spaces in a direction in which the injection needle passes.

5. The nucleic acid extraction module of claim 1, wherein the injection needle and the discharge needle protrude upward in parallel, and the sample container is coupled to the injection needle as the sample container moves downward in a state in which the septum is disposed thereunder, and the waste sample container is coupled to the discharge needle as the waste sample container moves downward at the same time as the sample container in a state in which the septum is disposed thereunder.

6. The nucleic acid extraction module of claim 1, further comprising:

a washing liquid container in which a sealed washing liquid space is formed and a septum through which the injection needle passes to be in fluid communication with the first flow path is provided at one end thereof; and a waste washing liquid container in which a sealed waste washing liquid space having a pressure lower than a pressure of the washing liquid space is formed and a septum through which the discharge needle passes to be in fluid communication with the second flow path is provided at one end thereof, wherein, when the injection needle and the discharge needle pass through the septum of the washing liquid container and the septum of the waste washing liquid container, respectively, a washing liquid stored in the washing liquid space moves to the nucleic acid attachment member through the first flow path by a pressure difference between the washing liquid space and the waste washing liquid space, and moves to the waste washing liquid space through the second flow path after foreign substances of the nucleic acid attachment member are washed.

7. The nucleic acid extraction module of claim 6, wherein the washing liquid container and the waste washing liquid container are provided as a plurality of washing liquid containers and a plurality of waste washing liquid containers.

8. The nucleic acid extraction module of claim 6, further comprising:

a pump configured to provide a drying gas;

a first drying container including a first drying space formed therein, a septum which is provided at one end thereof and through which the injection needle passes to be in fluid communication with the first flow path, and a first through-hole formed on one side thereof and coupled to the pump to inject the drying gas into the first drying space; and a second drying container having a second drying space formed therein, a septum which is provided at one end thereof and through which the discharge needle passes to be in fluid communication with the second flow path, and a second through-hole formed on one side thereof so that the second drying space is in fluid communication with an outside, wherein, when the injection needle and the discharge needle pass the septum of the first drying container and the septum of the second drying container, respectively, the drying gas passes through the first flow path, the nucleic acid attachment member, and the second flow path by the pump to remove the washing liquid.

9. The nucleic acid extraction module of claim 8, further comprising:

an eluate container in which a sealed eluate space is formed and a septum through which the injection needle passes to be in fluid communication with the first flow path is provided at one end thereof; and a storage container in which a sealed storage space having a pressure lower than a pressure of the eluate space is formed and a septum through which the discharge needle passes to be in fluid communication with the second flow path is provided at one end thereof, wherein, when the injection needle and the discharge needle pass through the septum of the eluate container and the septum of the storage container, respectively, an eluate stored in the eluate space moves through the first flow path by a pressure difference between the eluate space and the storage space, dissolves the nucleic acid attached to the nucleic acid attachment member, and then moves to the storage space through the second flow path.

10. A nucleic acid test system comprising:

the nucleic acid extraction module of claim 9;

a test base in which a nucleic acid amplification chip is installed and which is disposed on one side of the extraction base;

a test needle having a hollow shape, protruding from one side of the nucleic acid amplification chip, and connected to the nucleic acid amplification chip;

a cartridge that is rotatable about a rotary shaft, is vertically movable in a direction in which the rotary shaft extends, and has a plurality of accommodation portions formed on a lower surface thereof and formed along a circumference around the rotary shaft;

a rotary shaft member coupled to the rotary shaft of the cartridge;

a first driving unit that reciprocates between an upper side of the extraction base and an upper side of the test base and is coupled to the rotary shaft member to transfer a driving force for rotational movement and translational movement of the cartridge to the cartridge; and a nucleic acid test module including a light radiation unit configured to irradiate the nucleic acid amplification chip with light and a light detection unit configured to detect a fluorescent signal reflected from the nucleic acid amplification chip, wherein the sample container and the waste sample container, the washing liquid container and the waste washing liquid container, the first drying container and the second drying container, and the eluate container and the storage container are accommodated in the plurality of accommodation portions such that the sample container and the waste sample container, the washing liquid container and the waste washing liquid container, the first drying container and the second drying container, and the eluate container and the storage container are arranged to face each other with the rotary shaft disposed at a center therebetween.

11. The nucleic acid test system of claim 10, further comprising a first heater that heats the sample container.

12. The nucleic acid test system of claim 10, further comprising a second heater disposed below the test base to control a temperature of the nucleic acid amplification chip.

13. The nucleic acid test system of claim 10, wherein the cartridge repeatedly performs a vertical movement and a rotational movement about the rotary shaft while positioned above the extraction base, so that the sample container and the waste sample container, the washing liquid container and the waste washing liquid container, the first drying container and the second drying container, and the eluate container and the storage container are sequentially coupled to the injection needle and the discharge needle, respectively.

14. The nucleic acid test system of claim 10, wherein the cartridge is lowered while positioned above the test base so that the storage container is coupled to the test needle, an inside of the nucleic acid amplification chip is maintained at a pressure smaller than a pressure of the storage space of the storage container, and the eluate stored in the storage space moves into the nucleic acid amplification chip by a pressure difference between the inside of the nucleic acid amplification chip and the storage container when the test needle passes through the septum of the storage container.

15. The nucleic acid test system of claim 10, further comprising:

a second driving unit disposed on one side of the first driving unit to provide a rotational driving force; and a drying arm that is connected to the pump, is coupled to the second driving unit, and pivots, wherein the drying arm pivots toward the first drying container in a state in which the first drying container and the second drying container are respectively coupled to the injection needle and the discharge needle, connects the through-hole of the first drying container and the pump, and supplies the drying gas to the first drying container.

* * * * *